No. 627,090.  
F. P. BIXLER.  
SHEARS.  
(Application filed Sept. 24, 1898.)  
(No Model.)  
Patented June 20, 1899.
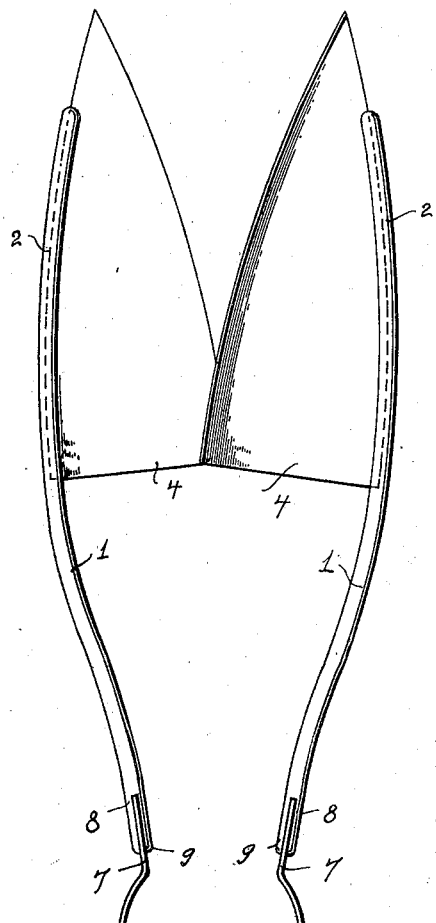
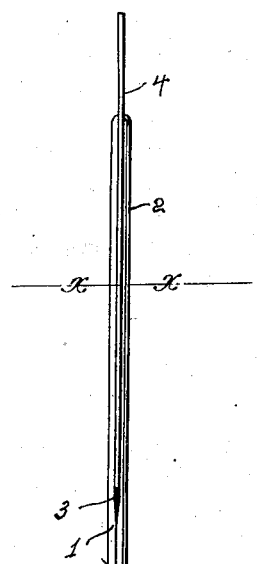
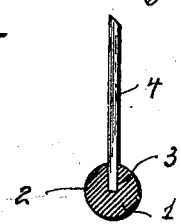
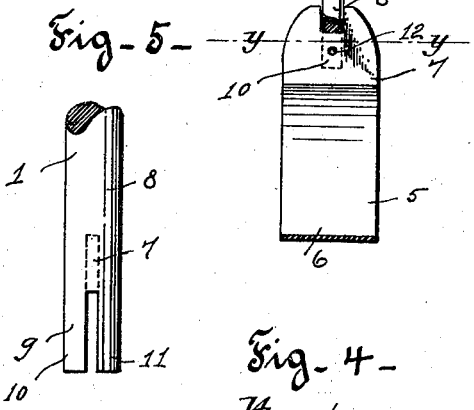
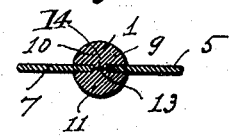
Witnesses—  
Martha Myers.  
Arion E. Wilson
Inventor.  
Frank P. Bixler  
By Wm. K. Terry  
atty

UNITED STATES PATENT OFFICE.

FRANK P. BIXLER, OF FREMONT, OHIO.

SHEARS.

SPECIFICATION forming part of Letters Patent No. 627,090, dated June 20, 1899.

Application filed September 24, 1898. Serial No. 691,754. (No model.)

*To all whom it may concern:*

Be it known that I, FRANK P. BIXLER, of Fremont, county of Sandusky, and State of Ohio, have invented new and useful Improvements in Shears; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to shears, having especial reference to shears adaptable for use in trimming lawns, vegetable growth, shrubbery, &c., and has for its object to provide for economy of construction, simplicity of parts, and effective operation.

I have found that in the shears constructed in accordance with my invention I can employ a good quality of metal for the shearing-blades and employ a proper spring metal. Both the shearing-blades and spring are connected with handles of softer metal. It has been found that shears for such purposes which are pressed out of a solid piece of metal are too hard to operate, as the requisite hardness of metal for the shearing-blades will form a spring of very low resiliency and require great force in shearing by overcoming the inherent rigidity of the spring. In shears constructed in accordance with my invention the spring possesses sufficient resiliency to keep the blades apart, and therefore does not tire the hand in its continued use for cutting vegetables, grass, &c.

In the drawings, Figure 1 is a top plan view of shears constructed in accordance with my invention. Fig. 2 is a sectional view showing the blades in section as secured within the handles. Fig. 3 is a section on line X X, Fig. 2. Fig. 4 is a section on line Y Y, Fig. 2; and Fig. 5 is a detail view of the attaching end of the handle-bar to the spring.

The shears comprise handles 1, which may be formed from a rod, wire, or any suitable metal. In both of the outer ends 2 of the handles there are formed slots 3, parallel with the longitudinal axis of the handles and adapted to receive shearing-blades 4. After the insertion of the blades into the slots 3 the metal of the handles is compressed, and thereby firmly secures the blades in position. The handles 1 are also slotted upon the opposite ends to receive the spring 5, which comprises a circular portion 6, the ends 7 of which are formed straight and are set at angles to continually urge the shear-blades in open position upon the removal of pressure from the handles. Each of the straight portions 7 of the spring are slotted to receive the ends 8 of the handles 1, and the extreme end portions 9 of the handles 1 are slotted transversely for some distance inwardly to receive the straight portions 7 and in coincidence with the overlapping metal portions 10 and 11 of the ends 8. There are provided in the straight portions 7 perforations 12, into which the metal of the handles is forced to form rivets 13, which secure the handles 1 and spring 5. It will be seen that by these means the handles are secured to the spring in a very rigid manner and prevent any play in the connecting portions. The rivets formed by pressing the slotted portions 9 over the spring will form rivets in the perforations and any pivotal movement of the spring is prevented by the projecting portions 13 and 14, which project upon solid portions 8 of the handles 1 in diametrically opposite position. From the spring 5 and toward the blades the handles 1 are bent in such a way as to form a handle by which to operate them. A preferable form of such a curvature is illustrated in Fig. 2.

What I claim is—

In shears, handles having grooves formed therein adapted to receive shearing-blades, and to be compressed upon the blades, a spring comprising a circular portion, the ends of which terminate in straight portions set at angles to each other, whereby the shearing-blades are normally urged outwardly, a slotted portion formed upon the opposite ends of the handles, adapted to receive the straight portions of the spring, the straight portions of the spring being notched to receive a slotted portion of said handles, and perforations provided in the spring, inserted in the slot of the said end, whereby, when the slotted portion of the handle is compressed, the metal is forced inwardly into the perforation of the straight portion of the spring, and thereby form rivets to secure the spring to the handles.

In testimony that I claim the foregoing as my own I hereby affix my signature in presence of two witnesses.

FRANK P. BIXLER.

Witnesses:
JAMES W. DUNFEE,
J. M. DRYFOOS.